United States Patent [19]

Romero

[11] Patent Number: 5,127,564
[45] Date of Patent: Jul. 7, 1992

[54] BICYCLE HOLDER FOR PICKUP TRUCK

[76] Inventor: Henry F. Romero, 1420 Loma Hermosa, N.W., Albuquerque, N. Mex. 87105

[21] Appl. No.: 674,932
[22] Filed: Mar. 26, 1991
[51] Int. Cl.⁵ .............................. B60R 9/00
[52] U.S. Cl. .................. 224/42.45 R; 224/42.03 B
[58] Field of Search .......... 224/42.03 B, 42.45 R, 224/324; 211/17, 22

[56] References Cited

U.S. PATENT DOCUMENTS

| 2,873,034 | 2/1959 | Laing | 211/17 |
|---|---|---|---|
| 3,656,670 | 4/1972 | Hill | 224/42.45 R |
| 3,912,139 | 10/1975 | Bowman . | |
| 4,934,572 | 6/1990 | Bowman et al. . | |
| 4,953,820 | 9/1990 | Yoder . | |

FOREIGN PATENT DOCUMENTS

| 1127765 | 12/1956 | France | 211/17 |
|---|---|---|---|
| 2472503 | 7/1981 | France | 211/17 |
| 7779 | 6/1898 | Norway | 211/17 |

OTHER PUBLICATIONS

ID Pick-Up Truck Rack, Yakima '89-'90 (only information available).

Primary Examiner—Linda J. Sholl
Attorney, Agent, or Firm—Robert W. Harris

[57] ABSTRACT

Device for carrying a bicycle in the back of a pickup truck, having an adjustable length base which may be clamped to the bed flanges of pickup trucks of varying width; a support tube pivotally mounted to the middle portion of the base; and a bike holder assembly attached to the upper end of the support tube, which assembly may be used to adjustably clamp the handlebar of the bicycle to handlebar rest plate which is part of the assembly. The bike holder assembly includes a slide bar having a cross bar on which two handlebar clamps are mounted, and a mechanism for adjustably moving the slide bar so as to move the handlebar clamps to clamp the bicycle handlebar against the handlebar rest plate.

13 Claims, 2 Drawing Sheets

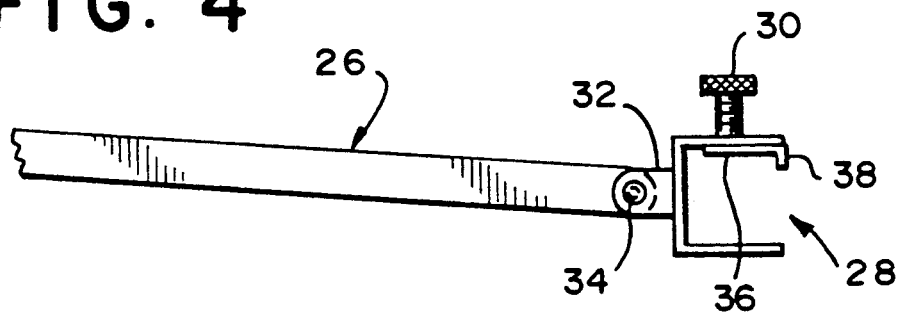
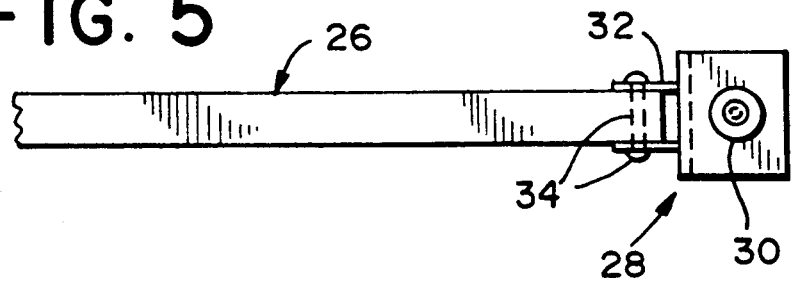
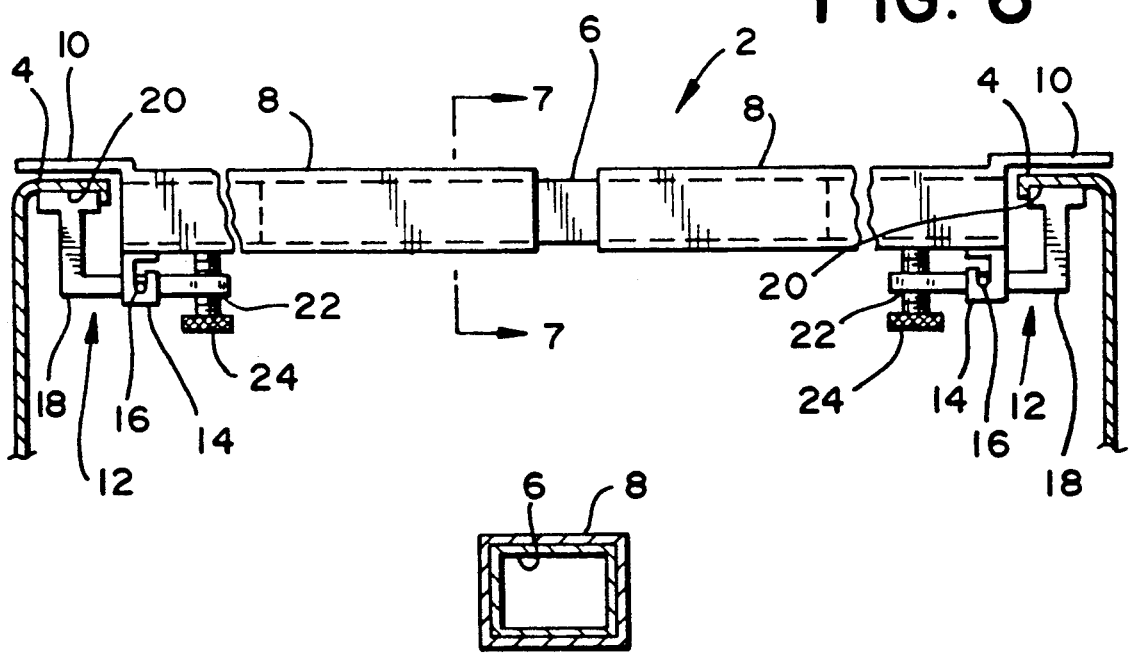

BICYCLE HOLDER FOR PICKUP TRUCK

BACKGROUND OF THE INVENTION

The present invention concerns devices for carrying bicycles in vehicles, which have in recent years become increasingly popular, particularly for use by city dwellers who wish to ride bicycles outside the urban areas, away from the dangerous congestion of city traffic.

A number of devices have been devised for transporting motorcycles and bicycles in the back of pickup trucks. Many of these devices have involved racks which can be installed in the backs of pickup trucks, extending across the entire beds of the trucks, which may be used to transport a number of bicycles in each truck, as discussed in the background art section of U.S. Pat. No. 4,934,572 of Bowman. Racks for carrying motorcycles in the vehicles have also been devised, as discussed in the background art section of U.S. Pat. No. 3,912,139 of Bowman. Some such racks have mounted the motorcycles or bicycles by engaging their wheels, and have been relatively complex structures. Another type of apparatus is disclosed in U.S. Pat. No. 4,934,572 of Bowman, which is a clamping apparatus that is used to secure the front forks and skewer of a bicycle to the rail of a pickup truck bed, but which evidently requires removal of the front wheel of the bicycle. Col. 2, lines 24–28; FIG. 2.

For persons who wish to transport only one or more bicycles in the backs of pickup trucks or other vehicles, it is desirable to provide a simple clamping apparatus which may be used to secure a bicycle to the vehicle for transport, without requiring removal of the bicycle wheel, and without the complexity and expense of a rack extending across the entire width of a pickup truck bed.

Applicant has provided such a device in the form of a simple, inexpensive and easily fabricated apparatus which secures the bicycle to the vehicle by clamping the bicycle handlebars, and which does not require use of a mobile bicycle rack.

SUMMARY OF THE INVENTION

An apparatus for holding a bicycle upright in the back of a pickup truck for transport, with which the bicycle may easily and quickly be secured, without any need to remove the front tire of the bicycle. The apparatus comprises a base, having an attachment means for attachment of said base to the bed of a pickup truck, for pickup trucks of varying width; a support means, attached to said base; a handlebar rest, connected to said support means at the end of said support means opposite said base; and a handlebar clamping means, connected to said support means adjacent to said handlebar rest, for clamping the handlebars of said bicycle against said handlebar rest, for bicycles of varying widths of the stem.

In the preferred embodiment, the base comprises a truck bed attachment bar of adjustable width, oriented transversely to the longitudinal axis of the pickup truck, having a main portion formed of sliding telescoping tubes, and having adjustable clamp mechanisms on the ends, for clamping the base to the flanges on the upper sides of the pickup truck bed. The support means is, in the preferred embodiment, a bike holder tube which is pivotally connected at its lower end to the truck bed attachment bar by a clamp and connecting pin structure, and rigidly attached to a main body tube at its upper end. The handlebar clamping means, attached to the main body tube, comprises a pair of movable or fixed curved handlebar clamps, used to grasp the bicycle handlebars on either side of the bicycle axis, which clamps are mounted at an adjustable separation width on a cross bar which is essentially parallel to the truck bed attachment bar and to the direction in which the handlebars will be held secure; a handlebar clamp translation mechanism, comprising a slide bar essentially perpendicular to and attached to the cross bar, which slide bar is movable in a straight line in a direction along the axis of the slide bar, being guided by a surrounding slide bar guide formed of a portion of the main body tube, and being movable in a controlled manner by means of a threaded bolt rotatably secured at one end to the main body tube, and threadably and rotatably secured to a plate projecting downward from the slide bar, and having a handle at the opposite end of said bolt for rotation of said bolt to translate the slide bar; and a handlebar resting plate, attached to the end of the main body tube bearing the cross bar and handlebar clamps. Once the handlebar clamps have been positioned on the side of the handlebars opposite the handlebar resting plate, the user rotates the handle controlling translation of the slide bar, cross bar and handlebar clamps, in such direction as to cause the handlebar clamps to firmly clasp the handlebars against the handlebar resting plate, thus securing the bicycle to the pickup truck bike holder.

BRIEF DESCRIPTION OF THE DRAWINGS

FIG. 4 is a side elevational view of the lower portion of the bike holder tube and the clamping mechanism used to clamp said tube to the truck bed attachment bar which forms the base of the preferred embodiment.

FIG. 5 is a plan view of the structure shown in FIG. 4.

FIG. 6 is a side elevational view of the truck bed attachment bar, ready for clamping to the flanges of the pickup truck bed.

FIG. 7 is a section of the truck bed attachment bar, along the section 7—7 of FIG. 6.

DESCRIPTION OF THE PREFERRED EMBODIMENT

Figure 1:
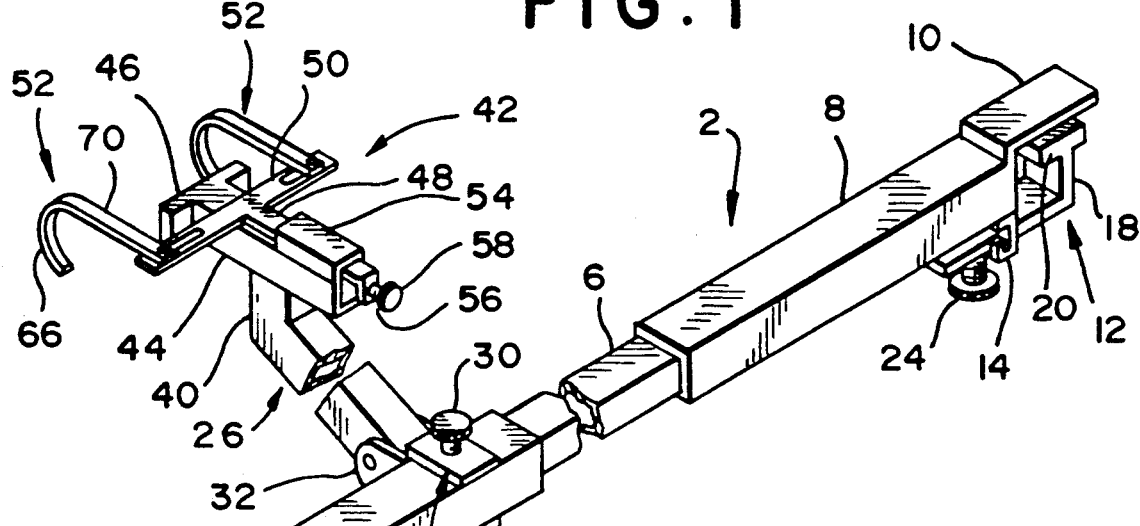
FIG. 1 is a perspective view of the entire apparatus of the preferred embodiment, as assembled for use.
Figure 2:
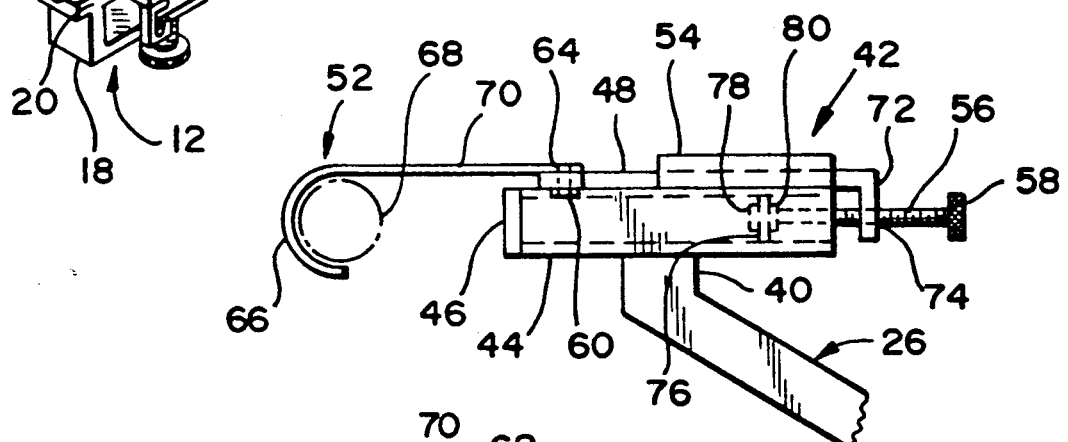
FIG. 2 is a side elevational view of the handlebar clamping means and handlebar rest, attached to the upper end of the bike holder tube (support means).
Figure 3:
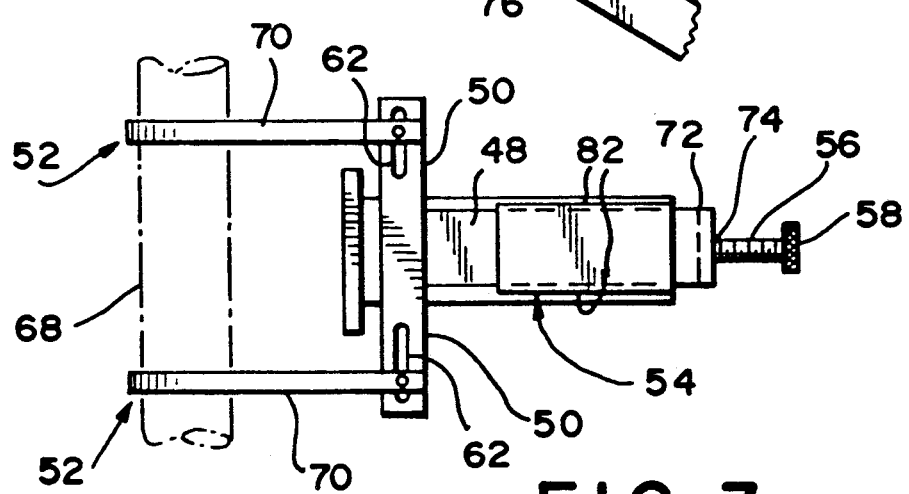
FIG. 3 is a plan view of structure shown in FIG. 2, omitting the bike holder tube for clarity.

Referring now to the drawings, in which like reference numbers denote like or corresponding elements, the base of the apparatus is a truck bed attachment bar 2, which is mounted transversely across the bed of the pickup truck, and secured to the pickup truck bed flange 4 on each side of the pickup truck bed. Truck bed attachment bar 2 has three main components: a centrally located inner tube 6, and two outer tubes 8, which surround inner tube 6 in telescoping snug-fit engagement, and are extended to reach the two sides of the pickup truck bed.

This arrangement of three tube sections, with the outer tubes 8 telescoping upon the inner tube 6, constitutes a means for adjusting the length of truck bed attachment bar 2, so that the invention may be easily employed with pickup trucks of varying width.

The invention provides means for securing the truck bed attachment bar 2 to the pickup truck bed flange 4 on both edges of the pickup truck bed. This securing means comprises the following components, at each end of truck bed attachment bar 2: a bed angle 10, which is a piece of angle iron welded to the top of the outer end of truck bed attachment bar 2; and a bed clamp 12, used to clamp truck bed attachment bar 2 to bed flange 4. The user secures bed clamp 12 to the outer end of truck bed attachment bar 2 by means of a bed clamp holder hook 14 welded to the bottom of the outer end of truck bed attachment bar 2, which receives a bed clamp pin 16 projecting from the side of bed clamp 12. The bed clamp 12 has an L-shaped main body 18 with a flat clamping jaw 20 at the top end thereof for clamping to bed flange 4. The lower end of main body 18 opposite clamping jaw 20 has a threaded vertical hole 22, through which a bed clamp adjusting bolt 24 is threaded. By tightening adjusting bolt 24 against the base of truck bed attachment bar 2, the operator causes the adjacent portion of main body 18 to move downward in relation to truck bed attachment bar 2, thus causing main body 18 as a whole to pivot about bed clamp pin 16, which is restrained from moving further away from truck bed attachment bar 2 by means of clamp holder hook 14. This pivoting motion of main body 18 causes clamping jaw 20 to clamp against bed flange 4, and a corresponding clamping of bed angle 10 against the top of bed flange 4. Thus the net effect is to clamp truck bed attachment bar 2 to bed flange 4. The operator employs these bed clamps 12 on each end of truck bed attachment bar 2 to secure truck bed attachment bar 2 to bed flange 4, after adjusting the length of truck bed attachment bar 2 to fit the width of the truck bed, by sliding outer tubes 8 with respect to inner tube 6.

Attached to the center of truck bed attachment bar 2 is the support means, which is a bike holder tube 26. The bike holder tube 26 is a hollow tube which is pivotally attached to truck bed attachment bar 2 by means of the combination of: a clamp 28, which is a C-shaped clamp having an inside diameter fitting inner tube 6 of truck bed attachment bar 2 in a snug-fit engagement, said C clamp 28 being securely fastened to the middle of truck bed attachment bar 2 by an attachment clamp bolt 30 which passes through a threaded hole in C clamp 28; parallel vertical C plate ears 32, which are welded to and extend from the side of C clamp 28; and by a bike holder tube connection pin 34, which passes through a hole near the lower end of bike holder tube 26, and through matching holes in C plate ears 32. Attached to the base of attachment clamp bolt 30 is a flat plate 36 for gripping the truck bed attachment bar 2, said plate 36 having a flat vertical lip 38 on the side opposite bike holder tube 26, for further gripping truck bed attachment bar 2 on the side opposite to bike holder tube 26, so that clamp 28 will not pull off from truck bed attachment bar 2 in the direction of bike holder tube 26.

The bike holder tube 26 is in operation oriented in a sloping configuration, rising to increasing elevation in the direction away from and towards the rear (in the truck bed) of its attachment to truck bed attachment bar 2 at C clamp 28. At the upper end of bike holder tube 26, bike holder tube 26 is bent upward into a short tube section 40, which is vertically oriented in the operational configuration of the device. The length of bike holder tube 26, including the height of tube section 40, is such that, at the desired operational angular orientation of bike holder tube 26, the upper end of tube section 40 will be located at a height above the truck bed of the pickup truck, which is nearly equal to the handlebar height of the bicycle to be secured for transport with the device. Of course this may be accomplished by use of bike holder tubes 26 of varying lengths, for varying angular orientations of bike holder tube 26.

At the upper end of bike holder tube 26 is the bike holder assembly 42, whose principal components are a main body tube 44, a handlebar resting plate 46, a slide bar 48, a cross bar 50, a pair of handlebar clamps 52, a slide bar guide 54, and a bolt 56 rotated by a handle 58.

The bike holder tube 26 is rigidly attached, at the upper end of tube section 40, by welding or screws or bolts, to a main body tube 44, which is a hollow tube, which is rectangular in the preferred embodiment (although it could be tubular), oriented horizontally in the operational configuration of the device, having a handlebar resting plate 46 at the rear end thereof (the end facing toward the rear of the truck in the operational configuration of the device), said plate being a flat plate for resting the bicycle handlebars against it in clamping engagement as described below.

On the top of main body tube 44 is mounted a slide bar 48, which is a flat plate having a longitudinal axis parallel to the longitudinal axis of main body tube 44, a length running most of the length of main body tube 44 and a width slightly less than that of main body tube 44. At the end of slide bar 48 adjacent to the rear end of main body tube 44 (the end bearing handlebar resting plate 46) slide bar 48 has attached thereto a cross bar 50, which is a flat plate extending horizontally across the top of main body tube 44, in a direction perpendicular to the longitudinal axes of main body tube 44 and slide bar 48, and having a length sufficient for mounting the bicycle handlebar clamps as described below, for clamping the handlebar of the bicycle, on each side of the longitudinal axis of the bicycle, against handlebar resting plate 46. In the preferred embodiment the slide bar 48 and the cross bar 50 are fabricated from a single piece of metal, although separate pieces could of course be used, secured to one another by welding, screws, or other suitable means.

A handlebar clamp 52 is attached to cross bar 50 near each end of handlebar clamp 52, by means of a threaded clamp bolt 60 which passes from below through a slot 62 in cross bar 50 and through a threaded hole 64 in handlebar clamp 52. Slot 62 extends long the longitudinal axis of cross bar 50 near the end of cross bar 50. The clamp bolt 60 may be tightened to secure handlebar clamp 52 to cross bar 50 at a fixed position along slot 62. The slots 62 near the ends of cross bar 50 allow latitude in using the device for different bicycles having stems of varying widths.

Each of the two handlebar clamps 52 has a curved clamping portion 66, in the form of a half circle with convex side facing forward in relation to the pickup truck, extending downward from the rear end of the handlebar clamp 52 in the operational configuration of the device, used for clamping the bicycle handlebar 68 against handlebar resting plate 46; and a straight upper portion 70, extending across the handlebar 68 to cross bar 50. The length of upper portion 70 of handlebar clamp 52 need only be sufficient to exceed the widths of handlebars 68 for bicycles of interest.

As a means of clamping handlebar 68 against handlebar resting plate 46, the device provides a means for moving handlebar clamp 52 in the direction of handlebar resting plate 46, by moving cross bar 50 and slide bar 48 forward (with reference to the pickup truck) away from handlebar resting plate 46. This means comprises in combination: (1) a plate 72 attached to and extending downward from the forward end of slide bar 48 (the end facing forward in relation to the pickup truck, which is opposite the end of main body tube 44 bearing handlebar resting plate 46, said plate having a threaded hole 74 therethrough near the lower end thereof; (2) a threaded bolt 56 threadably engaging plate 72 by passing through threaded hole 74; (3) an anchoring plate 76, transverse to the longitudinal axis of main body tube 44 and securely attached by welding or screws to the underside of main body tube 44 near the front end of main body tube 44 in the operational configuration of the device, to which anchoring plate 76 the bolt 56 is rotatably secured, by an arrangement in which an end portion of bolt 56 passes through an unthreaded hole (not shown) in anchoring plate 76, with the end portion of bolt 56 on the front and rear sides of anchoring plate 76 being attached to small flanges 78 and 80 which are larger than said hole in said anchoring plate 76, so as to prevent linear motion of bolt 56 with respect to anchoring plate 76; (4) a handle 58, attached to the end of bolt 56 opposite flange 78, which handle may simply be a finger-turned wheel with a knurled edge for secure gripping, and is used to rotate bolt 56; and (5) a slide bar guide 54, attached to the top of main body tube 44, just above and in snug-fit engagement with slide bar 48, which slide bar guide 54 is a plate having a longitudinal axis parallel to the longitudinal axes of main body tube 44 and slide bar 48, and having a width just slightly exceeding the width of slide bar 48, and having edges 82 which extend downward on either side of slide bar 48 to join the upper surface of main body tube 44 at a welded joint, so that the lower surface and edges 82 of slide bar guide 54 engage the slide bar 48 in a snug-fit sliding engagement. Using this combination of components the operator may move slide bar 48, cross bar 50, and thus handlebar clamps 52 longitudinally with respect to the longitudinal axis of main body tube 44, by simply rotating handle 58. Rotation of handle 58 causes slide bar 48 to be moved longitudinally along main body tube 44, within slide bar guide 54, because of the translational motion of plate 72 at the forward end of slide bar 48, caused by the motion of the threads of bolt 56 through threaded hole 74 in plate 72.

The operation of the device is quite simple. The operator first attaches truck bed attachment bar 2 to the pickup truck bed, by laying truck bed attachment bar 2 transversely across the bed of the pickup truck, then grasping the outer tubes 8 of truck bed attachment bar 2 and sliding them together or apart to adjust the length of truck bed attachment bar 2 to fit the width of the pickup truck bed, so that the bed angles 10 rest upon the tops of the two bed flanges 4, then attaching the two bed clamps 12 to the ends of truck bed attachment bar 2, with the bed clamp pins 16 engaged by the clamp holder hooks 14, and then tightening the bed clamps 12 to secure the ends of truck bed attachment bar 2 to the bed flange 4, by tightening the adjusting bolts 24.

The operator then connects bike holder tube 26 to the center of truck bed attachment bar 2, by slipping C clamp 28 over outer tubes 8, and tightening attachment clamp bolt 30. The device will ordinarily be stored for use with bike holder tube 26 already pivotally connected to C clamp 28 by connection pin 34 as described above, so that bike holder tube 26 is pivotally attached to truck bed attachment bar 2 by simply attaching C clamp 28 to truck bed attachment bar 2 in the manner just described.

Similarly the bike holder assembly 42 will already be attached at the upper end of tube section 40 of bike holder tube 26 in the storage configuration of the device.

After the bike holder tube 26 and bike holder assembly 42 are thus pivotally secured to truck bed attachment bar 2, and the bike holder tube 26 has been rotated upward so that the handlebar clamps 52 are at a suitable height for clamping the handlebars 68 of the bicycle, with upper portion 70 of handlebar clamp 52 located just above handlebar 68, the operator attaches the bicycle to bike holder assembly 42, by loosening bolt 56, hooking the handlebar clamps 52 over the handlebar 68 on either side of the stem, having roughly centered the bicycle with respect to the bike holder assembly 42 for this purpose, with handlebar 68 located between handlebar clamp 52 and handlebar resting plate 46, and then tightens bolt 56 by rotating handle 58 in the proper direction, so as to securely clamp handlebar 68 against handlebar resting plate 46.

Those familiar with the art will appreciate that the invention may be employed in numerous specific configurations other than the specific forms disclosed herein, without departing from the essential substance thereof.

For example, and not by way of limitation, although the parts of the invention are fashioned of steel in the preferred embodiment, it would of course be possible to use other metals or plastic components of suitable strength instead.

Similarly, although the truck bed attachment bar 2 is attached to the bed flange 4 on either side of the truck bed of the pickup truck by means of bed clamps 12, numerous other types of attachment means could be used instead. For example, bolts and nuts could be used to attach bed angle 10 to bed flange 4, by drilling suitable holes in bed angle 10 and bed flange 4.

Although bike holder tube 26 is pivotally attached to truck bed attachment bar 2 by means of C clamp 28, C plate ears 32, and connection pin 34, numerous other equivalent means for effecting a pivotal attachment could of course be used instead, such as, for example using a hinge attached to the upper surface of truck bed attachment bar 2 and to bike holder tube 26.

The scope of the invention is defined by the following claims, including also all subject matter encompassed by the doctrine of equivalents as applicable to the claims.

I claim:

1. An apparatus for securing a bicycle having a handlebar for transport in the bed of a pickup truck having a principal longitudinal axis, comprising:
    (a) a base;
    (b) base attachment means, for connection to said base, for attaching said base to said bed of said pickup truck;
    (c) support means, for connection to said base, and for extending generally upward from said base, and for supporting objects on top of said support means at a height above said base substantially equal to the height of said handlebar of said bicycle when said bicycle is placed upright in said bed of said pickup truck;

(d) handlebar rest means, for connection to the upper portion of said support means, for resting the handlebar of a bicycle against said handlebar rest means;

(e) handlebar clamping means, for connection to the upper portion of said support means, for clamping said handlebar of said bicycle against said handlebar rest means, comprising a plurality of handlebar clamps, connected to the upper portion of said support means, and a handlebar clamp movement means, connected to said upper portion of said support means, for moving said handlebar clamps toward said handlebar rest means; and (f) a main body tube having a principal longitudinal axis, attached to the upper end of said support means, and wherein said handlebar rest means is attached to one end of said main body tube; and wherein said handlebar clamp movement means comprises a slide bar, connected to the upper surface of said main body tube, having a principal longitudinal axis parallel to said principal longitudinal axis of said main body tube, and having a length extending at least substantially the full length of said main body tube, and a cross bar, attached to said slide bar at the end of said slide bar closest to said handlebar rest means, said handlebar clamps being attached to said cross bar; and sliding control means, connected to said slide bar and to said main body tube, for allowing a user of the apparatus to slide said slide bar in a controlled fashion along said upper surface of said main body tube and to thereby move said handlebar clamps toward said handlebar rest means.

2. Apparatus of claim 1, wherein said base has a principal longitudinal axis and has a length substantially equal to the width of said bed of said pickup truck.

3. Apparatus of claim 2, wherein said base further comprises length adjustment means for adjusting the length of said base to equal the widths of said beds of said pickup trucks for pickup trucks of varying width.

4. Apparatus of claim 3, wherein said length adjustment means comprises at least two tubular sections of said base, having slightly different diameters, in telescoping snug-fit engagement with one another.

5. Apparatus of claim 2 for use in a pickup truck having a bed flange on each side of said bed of said pickup truck, wherein said base attachment means comprises a clamping means, for each end of said base, for clamping said end of said base to said bed flange of said pickup truck.

6. Apparatus of claim 2, wherein said support means further comprises means for pivotally connecting said support means to said base, and for allowing said support means to pivot about said base in a plane perpendicular to said principal longitudinal axis of said base.

7. Apparatus of claim 1, wherein each of said handlebar clamps is curved on one end in the form of a half circle, with the direction of said curvature being convex in the direction of said handlebar rest means.

8. Apparatus of claim 1, wherein said handlebar rest means is a flat plate.

9. Apparatus of claims 1, 4, 5 or 6, wherein said sliding control means comprises a projection, attached to and projecting downward from said slide bar in a direction at least substantially normal to said principal longitudinal axis of said main body tube, said projection having a threaded hole therethrough in a direction at least substantially parallel to said principal longitudinal axis of said main body tube; a threaded bolt, having threads matching and passing through said threaded hole, and being oriented in a direction at least substantially parallel to said principal longitudinal axis of said main body tube, said bolt being rotatably anchored to an anchoring plate securely attached to said main body tube; and a slide bar guide means, attached to the upper surface of said main body tube, for guiding sliding motion of said slide bar in a direction parallel to said principal longitudinal axis of said main body tube.

10. Apparatus of claim 9, wherein said slide bar guide means comprises a member having a principal longitudinal axis parallel to said principal longitudinal axis of said slide bar, and having a principal portion located just above said slide bar, and having a lower surface of said principal portion fitting the upper surface of said slide bar in a snug-fit engagement, and having a width just slightly exceeding the width of said slide bar, and having edges extending downward to the upper surface of said main body tube in snug-fit engagement with the edges of said bar, with the bottoms of said edges of said member being securely attached to said upper surface of said main body tube.

11. Apparatus of claims 1, 4, 5 or 6, wherein said main body tube has a flat upper surface, and wherein said slide bar and said cross bar are formed of a single piece of flat plate.

12. Apparatus of claims 1, 4, 5 or 6, wherein said components of said apparatus are fabricated of metal.

13. Apparatus of claims 1, 4, 5 or 6, wherein said handlebar clamp movement means further comprises means, connected to said handlebar clamps, for varying the lateral spacing between said handlebar clamps.

* * * * *